(12) United States Patent
Kim (10) Patent No.: US 12,503,115 B2
(45) Date of Patent: Dec. 23, 2025

(54) VEHICLE OVERTAKING CONTROL SYSTEM AND METHOD

(71) Applicant: HL Klemove Corp., Incheon (KR)

(72) Inventor: Jubong Kim, Seongnam-si (KR)

(73) Assignee: HL KLEMOVE CORP., Incheon (KR)

( * ) Notice: Subject to any disclaimer, the term of this patent is extended or adjusted under 35 U.S.C. 154(b) by 215 days.

(21) Appl. No.: 18/532,357

(22) Filed: Dec. 7, 2023

(65) Prior Publication Data

US 2024/0425052 A1    Dec. 26, 2024

(30) Foreign Application Priority Data

Jun. 23, 2023    (KR) .................. 10-2023-0081003

(51) Int. Cl.
| | | |
|---|---|---|
| *B60W 30/18* | (2012.01) | |
| *B60W 10/04* | (2006.01) | |
| *B60W 30/16* | (2020.01) | |

(52) U.S. Cl.
CPC ...... *B60W 30/18163* (2013.01); *B60W 10/04* (2013.01); *B60W 30/162* (2013.01); *B60W 2400/00* (2013.01); *B60W 2422/95* (2013.01); *B60W 2520/06* (2013.01); *B60W 2520/28* (2013.01); *B60W 2554/801* (2020.02); *B60W 2554/804* (2020.02); *B60W 2754/20* (2020.02); *B60W 2754/50* (2020.02)

(58) Field of Classification Search
CPC ........... B60W 30/18163; B60W 10/04; B60W 30/162; B60W 2400/00; B60W 2422/95; B60W 2520/06; B60W 2520/28; B60W 2554/801; B60W 2554/804; B60W 2754/20; B60W 2754/50; B60W 40/02; B60W 2420/403; B60W 2420/50; B60W 2552/20; B60W 2554/802; B60W 2556/50; B60Y 2400/3015; B60Y 2400/3017; B60Y 2400/303

See application file for complete search history.

(56) References Cited

U.S. PATENT DOCUMENTS

| | | | |
|---|---|---|---|
| 5,343,206 A * | 8/1994 | Ansaldi ................ | G01S 13/931 342/72 |
| 2005/0046953 A1 * | 3/2005 | Repetto ................ | G02B 27/017 359/630 |
| 2017/0309179 A1 * | 10/2017 | Kodama ................ | G01S 7/003 |

(Continued)

*Primary Examiner* — Ashley L Redhead, Jr.
(74) *Attorney, Agent, or Firm* — Hauptman Ham, LLP (57) ABSTRACT

A vehicle overtaking control system includes a traveling information detection means configured to provide traveling route information and road edge information of a traveling route of an own vehicle, detect a preceding vehicle and a trailing vehicle traveling in front and to a side-rear of the own vehicle, and detect a speed and distance to the own vehicle, and an overtaking control means configured to receive the traveling route information to determine whether the own vehicle is traveling on the highway and whether the own vehicle is traveling in an overtaking lane from the road edge information of the traveling route, and when the own vehicle is not traveling in the overtaking lane, perform control of limiting overtaking of the own vehicle with respect to the preceding and trailing vehicles based on the detected speeds and distances of the preceding vehicle and the trailing vehicle traveling in the overtaking lane.

20 Claims, 9 Drawing Sheets

(56) References Cited

U.S. PATENT DOCUMENTS

| | | | | |
|---|---|---|---|---|
| 2020/0361458 A1* | 11/2020 | Bartels | ................ | B60W 10/20 |
| 2021/0229804 A1* | 7/2021 | Gu | ........................ | G08G 1/012 |
| 2022/0001891 A1* | 1/2022 | Xiao | ................ | G01C 21/3461 |
| 2024/0083437 A1* | 3/2024 | Vetter | ................... | B60W 30/14 |

* cited by examiner

VEHICLE OVERTAKING CONTROL SYSTEM AND METHOD

CROSS REFERENCE TO RELATED APPLICATION

This application claims the priority of Korean Application No. 10-2023-0081003, filed on Jun. 23, 2023. The entire disclosure of the above application is incorporated herein by reference.

TECHNICAL FIELD

The present disclosure relates to a vehicle overtaking control system and a vehicle overtaking control method, particularly, in a vehicle having an adaptive cruise control function, to a vehicle overtaking control system and a vehicle overtaking control method capable of achieving safe traveling and reducing a risk of an accident by limiting overtaking of an own vehicle with respect to a preceding vehicle and a trailing vehicle traveling in an overtaking lane on a highway.

BACKGROUND

In general, an autonomous vehicle refers to a vehicle that can travel to a destination by self-awareness of a road and surrounding conditions without a driver manipulating an accelerator pedal, a steering wheel, or a brake.

As a representative technology enabling autonomous traveling, there is an advanced smart cruise control system (ASCC), which is a type of Advanced Driver Assistance System (ADAS). According to this technology, an own vehicle travels at a constant speed set by a driver when there is no preceding vehicle, and when the preceding vehicle is recognized, speed and distance to the preceding vehicle are detected, and a distance between the vehicles is automatically controlled. Moreover, according to this technology, the own vehicle is automatically stopped when the preceding vehicle stops and the own vehicle automatically starts when the preceding vehicle starts.

For autonomous traveling, technological developments such as high-performance cameras, lasers, and anti-collision devices are required, and a traveling situation recognition/response control technology that comprehensively determines and processes traveling situation information is essential.

Meanwhile, in a case where an autonomous vehicle encounters a slow-running truck or car in front of the autonomous vehicle when traveling while maintaining a lane, it needs to overtake such a low-speed vehicle for smooth traveling. Here, overtaking in a broad sense means changing to the left or right lane and then returning to the original lane.

That is, generally, the traveling lane is on the right, and the overtaking lane is on the left. In most cases of overtaking, it is common to change to the left lane, overtake a low-speed vehicle, and then return to the right lane.

However, recently, many countries have prohibited overtaking of a traveling vehicle to an overtaking lane for safety reasons and do not recommend the overtaking, and some countries regulate the overtaking by law. Therefore, there is a need for a technology for limiting overtaking for safety reasons in traveling of a vehicle.

SUMMARY

In order to achieve the above-described objects, according to an aspect of the present disclosure, there is provided a vehicle overtaking control system including: a traveling information detection means configured to provide traveling route information and road edge information of a traveling route of an own vehicle, detect a preceding vehicle and a trailing vehicle traveling in front and to the side-rear of the own vehicle, and detect a speed and distance to the own vehicle; and an overtaking control means configured to receive the traveling route information to determine whether the own vehicle is traveling on the highway and whether the own vehicle is traveling in an overtaking lane from the road edge information of the traveling route, and when the own vehicle is not traveling in the overtaking lane, perform a control operation of limiting overtaking of the own vehicle with respect to the preceding vehicle and the trailing vehicle based on the detected speed and distance of the preceding vehicle and the detected speed and distance of the trailing vehicle traveling in the overtaking lane.

The overtaking lane may be defined as a traveling lane on a steering wheel side of the own vehicle, and in a case of a left-hand drive vehicle, a left lane may be the overtaking lane, and in the case of a right-hand drive vehicle, a right lane may be the overtaking lane.

The traveling information detection means may include navigation configured to provide the traveling route information of the own vehicle, a front detection sensor configured to detect a preceding vehicle traveling in front of the own vehicle and measure speed and distance between the own vehicle and the preceding vehicle, a side-rear detection sensor configured to detect a trailing vehicle traveling to a side-rear of the own vehicle and measure speed and distance between the own vehicle and the traveling vehicle, a front photographing unit configured to acquire road edge information on one side of the traveling lane by capturing an image of a front traveling lane of the own vehicle, and a speed sensor configured to detect the traveling speed of the own vehicle.

The overtaking control means may include an overtaking lane determination unit configured to estimate and calculate a distance between the own vehicle and a road edge from the road edge information of the traveling information detection means and compare the calculated distance value with a preset range value to determine whether or not the own vehicle travels in the overtaking lane, a distance/speed control selection unit configured to select speed control or distance control of the own vehicle with respect to the preceding vehicle and the trailing vehicle based on the detected speed and distance to the preceding vehicle and the detected speed and distance to the trailing vehicle, when the overtaking lane determination unit determines that the own vehicle is not traveling in the overtaking lane, a speed-based demand acceleration/deceleration calculation unit configured to calculate a relative speed between the own vehicle and the preceding vehicle and calculate a relative speed between the own vehicle and the preceding vehicle and trailing vehicle in the overtaking lane to obtain speed-based demand acceleration/deceleration, when the speed control is selected by the distance/speed control selection unit, a distance-based demand acceleration/deceleration calculation unit configured to calculate the relative distance between the own vehicle and the preceding vehicle and calculate the relative distance between the own vehicle and the preceding vehicle and the trailing vehicle in the overtaking lane to calculate distance-based demand acceleration/deceleration, when the speed control is selected by the distance/speed control selection unit, and a control unit configured to perform control to limit overtaking of the own vehicle with respect to the preceding vehicle and the trailing vehicle in the overtaking lane by the calculated speed-based demand acceleration/deceleration or the calculated distance-based demand acceleration/deceleration.

The overtaking lane determination unit may determine that it is the overtaking lane when the compared distance value between the own vehicle and the road edge is within a preset range value, and determine that it is not the overtaking lane when the distance value exceeds the preset range value.

The distance/speed control selection unit may select the distance control when the relative distance between the own vehicle and the preceding vehicle and the trailing vehicle is equal to or more than a threshold value.

The distance/speed control selection unit may select the speed control when the relative distance between the own vehicle and the preceding vehicle and the trailing vehicle is less than a threshold value.

The speed-based demand acceleration/deceleration calculation unit may calculate the relative speed between the own vehicle and the preceding vehicle, calculate the relative speed between the own vehicle and the trailing vehicle, and calculate the demand deceleration or demand acceleration at the relative speed having a smaller value.

The distance-based demand acceleration/deceleration calculation unit may calculate the relative distance between the own vehicle and the preceding vehicle, calculate the relative distance between the own vehicle and the trailing vehicle, and calculate the demand deceleration or demand acceleration at the relative distance having a smaller value.

The overtaking control means may perform a control operation to limit the overtaking so as to further include a condition where a wheel speed of the own vehicle is equal to or more than a threshold value.

Moreover, in order to achieve the above-described objects, according to another aspect of the present disclosure, there is provided a vehicle overtaking control method including: providing traveling route information and road edge information of a traveling route of an own vehicle, detecting a preceding vehicle and a trailing vehicle traveling in front and to a side-rear of the own vehicle, and detecting a speed and distance to the own vehicle; and receiving the traveling route information to determine whether the own vehicle is traveling on the highway and whether the own vehicle is traveling in an overtaking lane from the road edge information of the traveling route, and when the own vehicle is not traveling in the overtaking lane, performing a control operation of limiting overtaking of the own vehicle with respect to the preceding vehicle and the trailing vehicle based on the detected speed and distance of the preceding vehicle and the detected speed and distance of the trailing vehicle traveling in the overtaking lane.

The overtaking lane may be defined as a traveling lane on a steering wheel side of the own vehicle, and in a case of a left-hand drive vehicle, a left lane may be the overtaking lane, and in the case of a right-hand drive vehicle, a right lane may be the overtaking lane.

The detecting of the speed and distance may include providing the traveling route information of the own vehicle, detecting a preceding vehicle traveling in front of the own vehicle to measure speed and distance between the own vehicle and the preceding vehicle and detecting a trailing vehicle traveling to a side-rear of the own vehicle to measure speed and distance between the own vehicle and the traveling vehicle, acquiring road edge information on one side of the traveling lane by capturing an image of a front traveling lane of the own vehicle, and detecting the traveling speed of the own vehicle.

The performing of the control operation may include estimating and calculating a distance between the own vehicle and a road edge from the road edge information of the traveling information detection means and comparing the calculated distance value with a preset range value to determine whether or not to travel in the overtaking lane, selecting speed control or distance control of the own vehicle with respect to the preceding vehicle and the trailing vehicle based on the detected speed and distance to the preceding vehicle and the detected speed and distance to the trailing vehicle, when it is determined that the own vehicle is not traveling in the overtaking lane, calculating a relative speed between the own vehicle and the preceding vehicle and calculating a relative speed between the own vehicle and the preceding vehicle and trailing vehicle in the overtaking lane is calculated to obtain speed-based demand acceleration/deceleration, when the speed control is selected, calculating the relative distance between the own vehicle and the preceding vehicle and calculating the relative distance between the own vehicle and the preceding vehicle and the trailing vehicle in the overtaking lane to calculate distance-based demand acceleration/deceleration, when the distance control is selected, and performing control to limit overtaking of the own vehicle with respect to the preceding vehicle and the trailing vehicle in the overtaking lane by the calculated speed-based demand acceleration/deceleration or the calculated distance-based demand acceleration/deceleration.

In the determining of whether or not to travel in the overtaking lane, it may be determined that it is the overtaking lane when the compared distance value between the own vehicle and the road edge is within a preset range value, and it may be determined that it is not the overtaking lane when the distance value exceeds the preset range value.

In the selecting of the speed control or the distance control, the distance control may be selected when the relative distance between the own vehicle and the preceding vehicle and the trailing vehicle is equal to or more than a threshold value.

In the selecting of the speed control or the distance control, the speed control may be selected when the relative distance between the own vehicle and the preceding vehicle and the trailing vehicle is less than a threshold value.

In the calculating of the speed-based demand acceleration/deceleration, the relative speed between the own vehicle and the preceding vehicle may be calculated, the relative speed between the own vehicle and the preceding vehicle in the overtaking lane and the relative speed between the own vehicle and the trailing vehicle in the overtaking lane may be calculated, and the demand deceleration or demand acceleration may be calculated at the relative speed having a smaller value.

In the calculating of the distance-based demand acceleration/deceleration, the relative distance between the own vehicle and the preceding vehicle may be calculated, the relative speed between the own vehicle and the relative distance between the own vehicle and the trailing vehicle in the overtaking lane may be calculated, and the demand deceleration or demand acceleration may be calculated at the relative distance having a smaller value.

In the performing of the control operation to limit the overtaking, a control operation may be performed to limit the overtaking so as to further include a condition where a wheel speed of the own vehicle is equal to or more than a threshold value.

DETAILED DESCRIPTION

Hereinafter, with reference to the accompanying drawings, embodiments of the present disclosure will be described in detail so that a person having ordinary knowledge in a technical field to which the present disclosure belongs can easily practice the embodiments.

However, the present disclosure may be implemented in many different forms and is not limited to the embodiments described herein. In order to clearly explain the present disclosure, parts irrelevant to the description are omitted in the drawings, and similar reference numerals are attached to similar parts throughout the specification. In addition, while explaining with reference to the drawings, even components represented by the same name may have different reference numerals depending on the drawings, the reference numerals are only described for convenience of description, and it is not interpreted that the concept, feature, function, or effect of each component is limited by the corresponding referential numeral.

Throughout the specification, when a part is said to be "connected" to another part, this includes not only the case where it is "directly connected" but also the case where it is "electrically connected" with another element interposed therebetween. In addition, when a part is said to "include" a certain component, it means that it may further include other components, not excluding other components unless otherwise stated. Accordingly, it should be understood that it does not preclude the possibility of the presence or addition of one or more other features, numbers, steps, operations, components, parts, or combinations thereof.

In this specification, "unit" or "module" includes a unit realized by hardware or software, or a unit realized by using both, and one unit is realized by using two or more hardware may be, or two or more units may be realized by one hardware.

Figure 1:
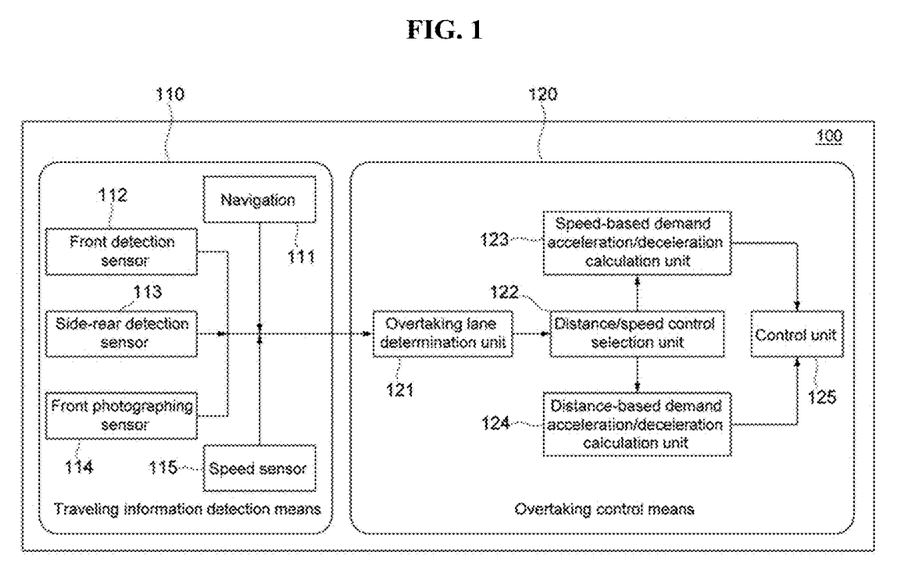
FIG. 1 is a diagram schematically illustrating a configuration of a vehicle overtaking control system according to one embodiment of the present disclosure.
Figure 2A:
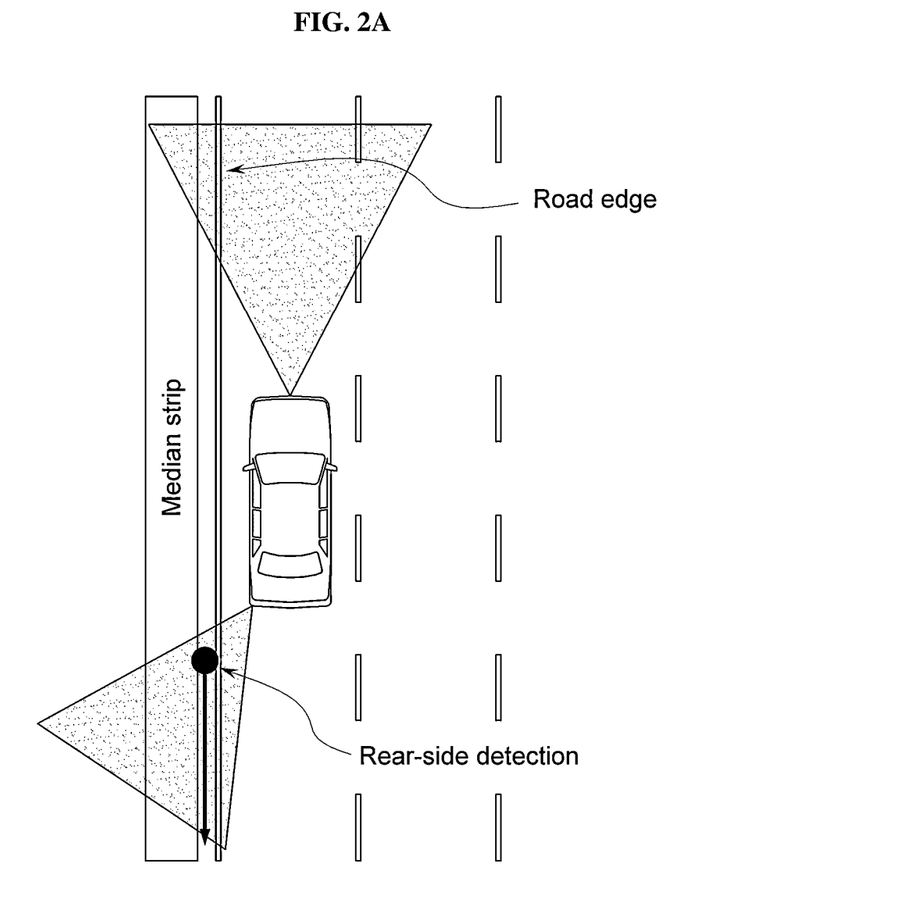
FIGS. 2A and 2B are diagrams illustrating an example of detecting a road edge and a rear-side object on a highway in the present disclosure.
Figure 2B:
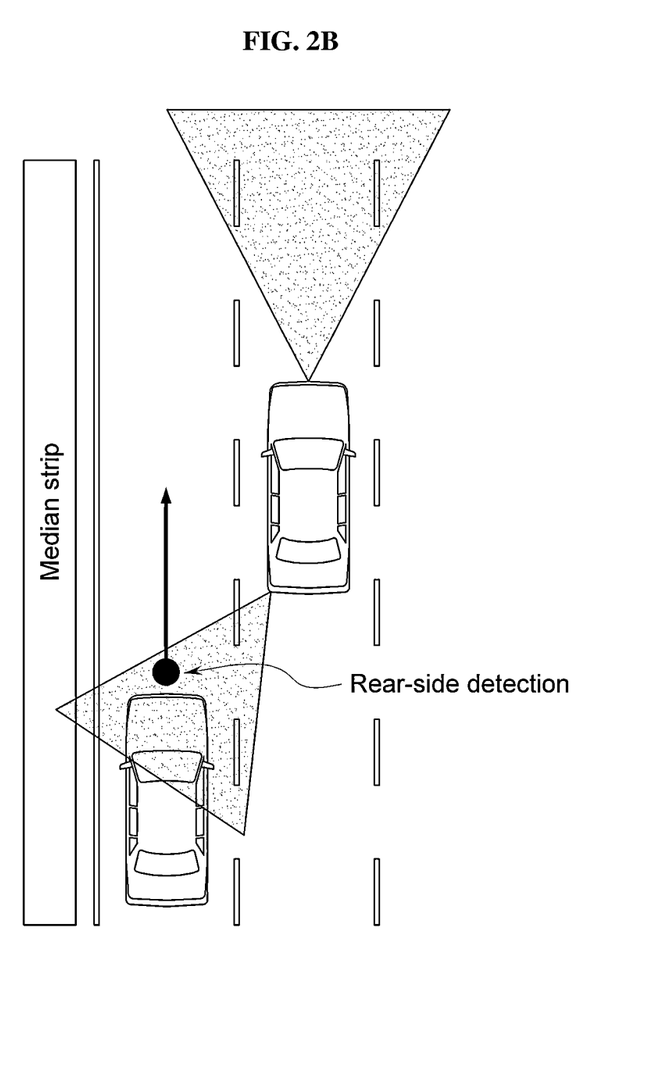

FIG. 1 is a diagram schematically illustrating a configuration of a vehicle overtaking control system according to one embodiment of the present disclosure, and FIGS. 2A and 2B are diagrams illustrating an example of detecting a road edge and a rear-side object on a highway in the present disclosure.

A vehicle overtaking control system 100 of the present disclosure is applied to a vehicle having an adaptive cruise control function, and limits overtaking of an own vehicle for a preceding vehicle and a trailing vehicle traveling in an overtaking lane on a highway.

Here, the overtaking lane is defined as a traveling lane on a steering wheel side of the own vehicle as an overtaking lane, and in the case of a left-hand drive vehicle, a left lane may be the overtaking lane, and in the case of a right-hand drive vehicle, a right lane may be the overtaking lane.

As illustrated in FIG. 1, the vehicle overtaking control system 100 of the present disclosure may include a traveling information detection means 110 and an overtaking control means 120.

The traveling information detection means 110 provides traveling route information and road edge information of a traveling route of the own vehicle, detects the preceding vehicle and the trailing vehicle traveling in front and to a side-rear of the own vehicle, and detects speed and speed to the own vehicle.

The traveling information detection means 110 may include a navigation 111, a front detection sensor 112, a side-rear detection sensor 113, a front photographing unit 114, and a speed sensor 115.

The navigation 111 provides traveling route information by calculating the location of the own vehicle by a signal received from a Global Positioning System (GPS). For example, the navigation 111 provides road information about whether a route on which the own vehicle is currently traveling is a highway or a general road.

The front detection sensor 112 detects the preceding vehicle traveling in front of the own vehicle and detects speed and distance to the own vehicle, and the side-rear detection sensor 113 detects the trailing vehicle traveling to the side-rear of the own vehicle and detects speed and distance to the own vehicle.

Here, the front detection sensor 112 and the side-rear detection sensor 113 may be a laser-based object detection sensor such as a radio detection and ranging (RADAR) device or a light detection and ranging (LIDAR) device.

More specifically, as illustrated in FIGS. 2A and 2B, the front detection sensor 112 may be used to detect or measure a traveling direction, a speed, and a speed change rate of the preceding vehicle, a relative distance between the preceding vehicle and the down vehicle, and the like, and the side-rear detection sensor 113 may be used to detect or measure a traveling direction, a speed, and a speed change rate of the trailing vehicle, a relative distance between the trailing vehicle and the own vehicle, and the like. Here, the side-rear detection sensor 113 may detect a distance from a median strip when the own vehicle travels on a highway while detecting a trailing vehicle traveling on the side and rear. At this time, the speed and distance detected by the front detection sensor 112 and the side-rear detection sensor 113 mean the relative speed and relative distance between the own vehicle, the preceding vehicle, and the trailing vehicle.

The front photographing unit 114 acquires road edge information on one side of the traveling lane by capturing an image of the front traveling lane of the own vehicle.

The front photographing unit 114 includes at least one camera and may provide a forward field of view (FOV) by the camera and include an imaging processing system for performing an operation such as specific image extraction and correction for captured image data.

According to one embodiment, the road edge is detected on one side of the front traveling lane photographed by the front photographing unit 114. For example, when a vehicle has a steering wheel on the left, it is detected whether there is a road edge in the left lane in the image of the traveling lane photographed in the front.

For example, when the traveling route of the own vehicle is a highway, a median strip may be installed in the center of the lane, and when the left steering wheel is the standard, the median strip exists on the left side of the vehicle in motion, and the road edge of the median strip is detected. Conversely, when the right steering wheel is the standard, the median strip exists on the right side of the traveling own vehicle and the road edge of the median strip is detected.

The speed sensor 115 detects or calculates the traveling speed of the own vehicle and provides the traveling speed to the overtaking control means 120.

Figure 3:
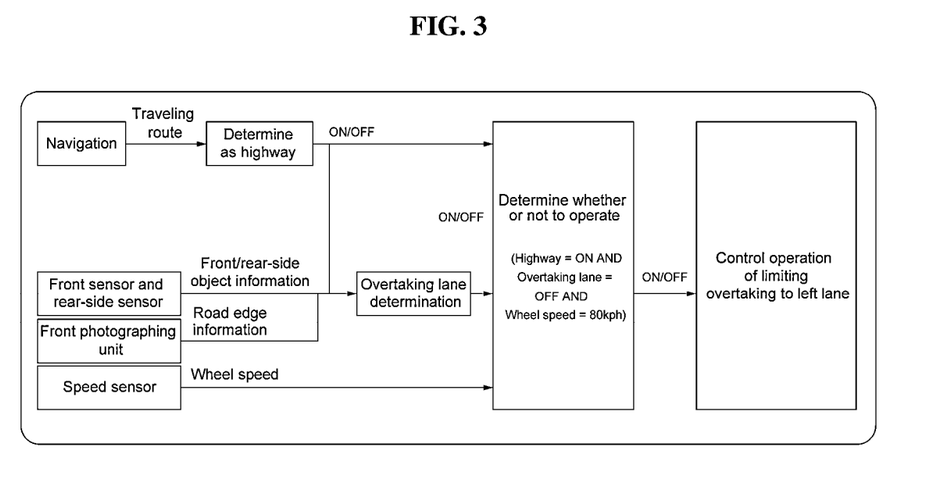
FIG. 3 is a diagram illustrating an example of performing a limiting operation of overtaking on a left lane according to the present disclosure.

FIG. 3 is a diagram illustrating an example of performing a limiting operation of overtaking on a left lane according to the present disclosure.

As illustrated in FIG. 3, the overtaking control means 120 receives the traveling route information, determines whether the own vehicle is traveling on the highway, and determines whether the own vehicle travels in the overtaking lane from the road edge information of the traveling route. Moreover, when the own vehicle does not travel in the overtaking lane, the overtaking control means 120 performs a control operation for limiting the overtaking of the own vehicle with respect to the preceding vehicle and the trailing vehicle based on the detected speed and distance of the preceding vehicle and the detected speed and distance of the trailing vehicle traveling in the overtaking lane.

The overtaking control means 120 includes an overtaking lane determination unit 121, a distance/speed control selection unit 122, a speed-based demand acceleration/deceleration calculation unit 123, a distance-based demand acceleration/deceleration calculation unit 124, and a control unit 125.

As illustrated in FIGS. 2A and 2B, the median strip is located on the left side of the steering wheel of the vehicle and descriptions will be made with reference to an example for limiting the overtaking in a left lane.

The overtaking lane determination unit 121 estimates and calculates a distance between the own vehicle and the road edge from the road edge information of the traveling information detection means 110, and compares the calculated distance value with a preset range value to determine whether or not to travel the overtaking lane. At this time, that is, the overtaking lane determination unit 121 determines that it is an overtaking lane when the compared distance value between the own vehicle and the road edge is within a preset range value, and determines that it is not an overtaking lane when the distance value exceeds the range value.

More specifically, the overtaking lane determination unit 121 determines whether the own vehicle is traveling in the overtaking lane by utilizing the highway traveling determination and front/rear-side object information of the corner radar.

That is, the overtaking lane determination unit 121 receives the highway traveling information from the navigation 111 and determines that the vehicle is traveling on the highway, receives the detection information on whether the rear object approaches the target position (left or right) through the front detection sensor 112 and the side-rear detection sensor 113, and receives information detecting the presence or absence of the road edge at the target position (left or right) through the front photographing unit 114.

At this time, as illustrated in FIG. 2A, it is detected that there is no approaching object information detected from the front detection sensor 112 and the side-rear detection sensor 113 and there is the road edge of the median strip, and the overtaking lane determination unit 121 determines that the own vehicle travels in the overtaking lane.

Here, even when it is detected that there is the road edge of the median strip, the detected separation distance between the median strip and the own vehicle may be calculated and reflected in the overtaking lane determination.

For example, it may be determined that the own vehicle is traveling in the overtaking lane by reflecting the reference value that the separation distance value between the road edge and the own vehicle detected in the overtaking lane is smaller than the separation distance value between the road edge and the own vehicle detected in another lane.

Meanwhile, as illustrated in FIG. 2B, the overtaking lane determination unit 121 may determine that the own vehicle is not traveling in the overtaking lane by reflecting a reference value in which the separation distance value between the road edge and the own vehicle is greater than the separation distance value between the road edge and the own vehicle detected in the overtaking lane even when there is information on the approaching object (preceding vehicle or trailing vehicle) detected from the front detection sensor 112 and the side-rear detection sensor 113 and the road edge of the median strip is detected.

Figure 4:
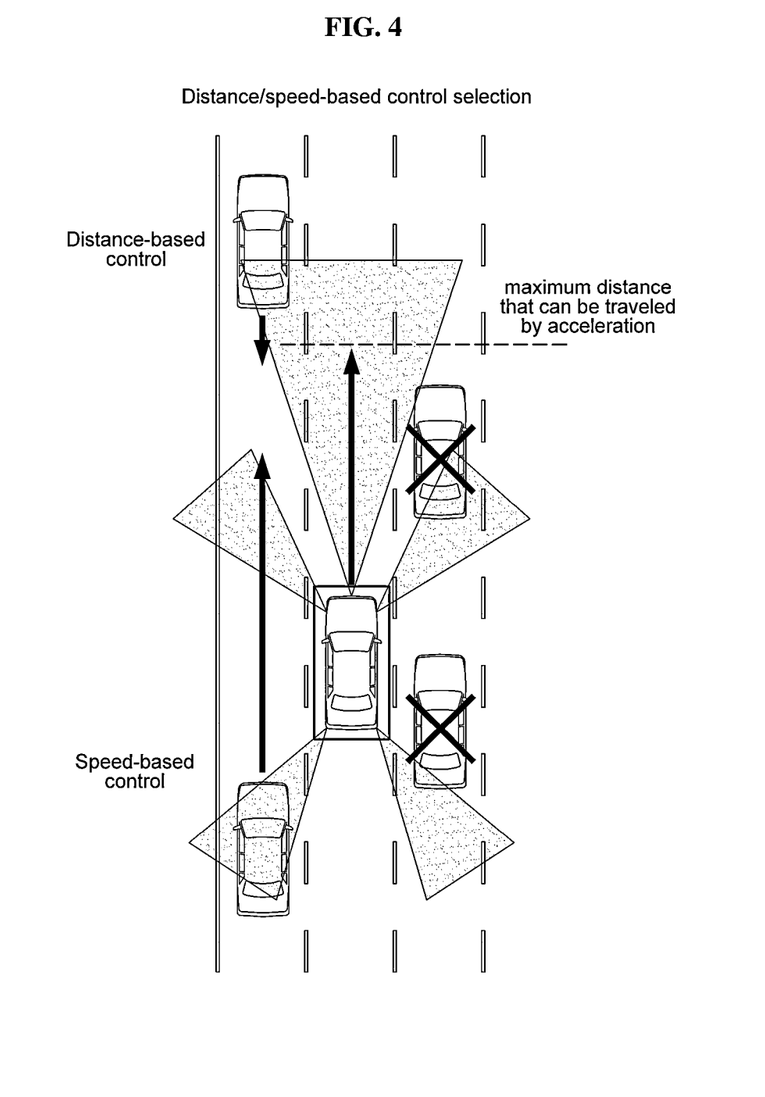
FIG. 4 is a diagram illustrating an example of distance/speed-based demand acceleration/deceleration control in a left lane according to the present disclosure.
Figure 5:
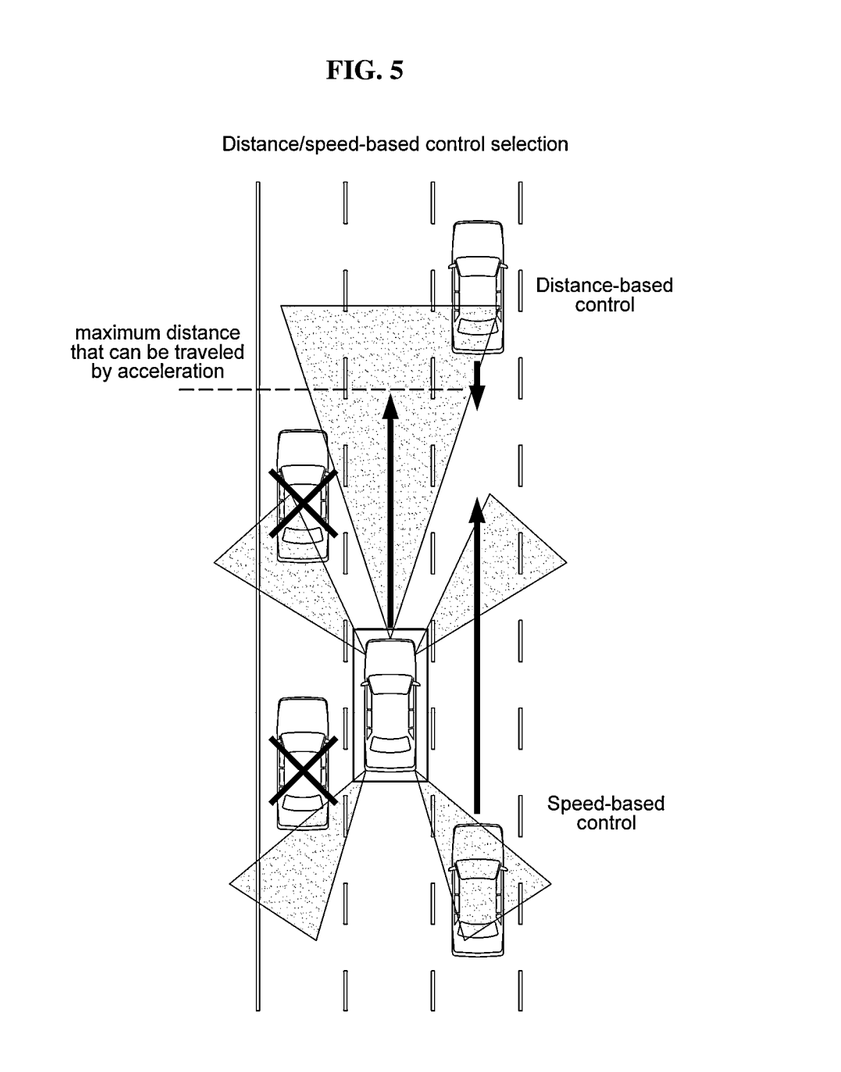
FIG. 5 is a diagram illustrating an example of distance/speed-based demand acceleration/deceleration control in a right lane according to the present disclosure.

FIG. 4 is a diagram illustrating an example of distance/speed-based selection control in a left lane according to the present disclosure, and FIG. 5 is a diagram illustrating an example of distance/speed-based demand selection control in a right lane according to the present disclosure. Here, the overtaking lane is defined as the traveling lane on the steering wheel side of the own vehicle as an overtaking lane, and in the case of a left-hand drive vehicle, the left lane may be the overtaking lane, and in the case of a right-hand drive vehicle, the right lane may be the overtaking lane.

As illustrated in FIGS. 4 and 5, when the overtaking lane determination unit 121 determines that the own vehicle is not traveling in the overtaking lane, the distance/speed control selection unit 122 selects speed control or distance control of the own vehicle with respect to the preceding vehicle and the trailing vehicle based on the detected speed and distance to the preceding vehicle and the detected speed and distance to the trailing vehicle.

More specifically, the distance/speed control selection unit 122 may select the distance control when the relative distance between the own vehicle and the preceding vehicle and trailing vehicle is equal to or more than a threshold value, and the distance/speed control selection unit 122 may select the speed control when the relative distance between the own vehicle and the preceding vehicle and the trailing vehicle is less than the threshold value.

For example, in a long-distance area where the relative distance between the preceding vehicle traveling in the overtaking lane and the own vehicle is equal to or more than a threshold value of 100 m, the distance-based control may be performed to perform smooth control with respect to the preceding vehicle.

Meanwhile, in a short-distance area where the relative distance between the trailing vehicle traveling in the overtaking lane and the own vehicle is equal to or less than the threshold of 30 m, the speed-based control can be performed to prevent excessive deceleration with respect to the trailing vehicle.

For example, when the distance-based control is performed in a state where the speed of the trailing vehicle is 100 kph and the speed of the own vehicle is 80 kph and the relative distance is 10 m, excessive deceleration may lead to a dangerous situation. Therefore, it may be desirable for safety to perform the speed-based control in order to match the speed with the trailing vehicle. In this case, since vehicles traveling in the right lane of the own vehicle are not subject to overtaking limiting, the own vehicle can overtake vehicles in the right lane.

In addition, the distance/speed control selection unit 122 determines whether to control overtaking by reflecting a condition that the wheel speed of the own vehicle detected by the speed sensor is equal to or more than a threshold value (80 kph). For example, when the traveling speed of the own vehicle on a highway is equal to or more than the threshold value (80 kph), the overtaking of the own vehicle is limited with respect to vehicles traveling in the overtaking lane.

However, when the traveling speed of the own vehicle on a highway is equal to or less than the threshold value, since the speed of the own vehicle is relatively low, the overtaking of the own vehicle may not be limited with respect to vehicles traveling in the overtaking lane.

Meanwhile, when the overtaking lane determination unit 121 determines that the own vehicle is traveling in the overtaking lane, the distance/speed control selection unit 122 does not perform the overtaking limiting control operation.

When the speed control is selected by the distance/speed control selection unit 122, the speed-based demand acceleration/deceleration calculation unit 123 calculates the relative speed between the own vehicle and the preceding vehicle, and calculates the speed-based demand acceleration/deceleration for the own vehicle and the preceding vehicle and trailing vehicle in the overtaking lane.

More specifically, the speed-based demand acceleration/deceleration calculation unit 123 calculates the relative speed between the own vehicle and the preceding vehicle, and calculates the relative speed between the own vehicle and the preceding and trailing vehicles in the overtaking lane to calculate the demand deceleration or demand acceleration at the relative speed having a smaller value.

For example, the demand acceleration/deceleration for the preceding vehicle is calculated using the relative speed between the own vehicle and the preceding vehicle received from the front photographing unit 114 and the front detection sensor 112.

Moreover, using the relative speed between the preceding and trailing vehicles in the overtaking lane received from the front photographing unit 114, the front detection sensor 112, and the side-rear detection sensor 113, the demand acceleration/deceleration for the preceding vehicle and the trailing vehicle is calculated.

At this time, a smaller demand acceleration/deceleration is finally calculated by comparing the two detected demand acceleration/decelerations. That is, when the demand deceleration between the own vehicle and the preceding vehicle is 15 kph and the demand deceleration for the preceding vehicle in the overtaking lane is 10 kph, 10 kph which is a smaller value is calculated as the final demand deceleration.

When the distance control is selected by the distance/speed control selection unit 122, the distance-based demand acceleration/deceleration calculation unit 124 calculates the relative distance between the own vehicle and the preceding vehicle, and calculates the relative distance between the own vehicle and the preceding vehicle and the trailing vehicle in the overtaking lane to the distance-based demand acceleration/deceleration.

More specifically, the distance-based demand acceleration/deceleration calculation unit 124 calculates the relative distance between the own vehicle and the preceding vehicle, calculates the relative distance between the own vehicle and the preceding vehicle in the overtaking lane, calculates the relative distance between the own vehicle and the trailing vehicle in the overtaking lane, and calculates the demand deceleration or demand acceleration at the relative distance having a smaller value.

The control unit 125 performs control to limit the overtaking of the own vehicle with respect to the preceding vehicle and the trailing vehicle with the calculated speed-based demand acceleration/deceleration or the calculated distance-based demand acceleration/deceleration. That is, as illustrated in FIGS. 4 and 5, the risk of an accident during traveling is reduced by controlling the own vehicle to limit the overtaking with respect to the preceding vehicle and the trailing vehicle traveling in the overtaking lane based on the speed and distance.

Figure 6:
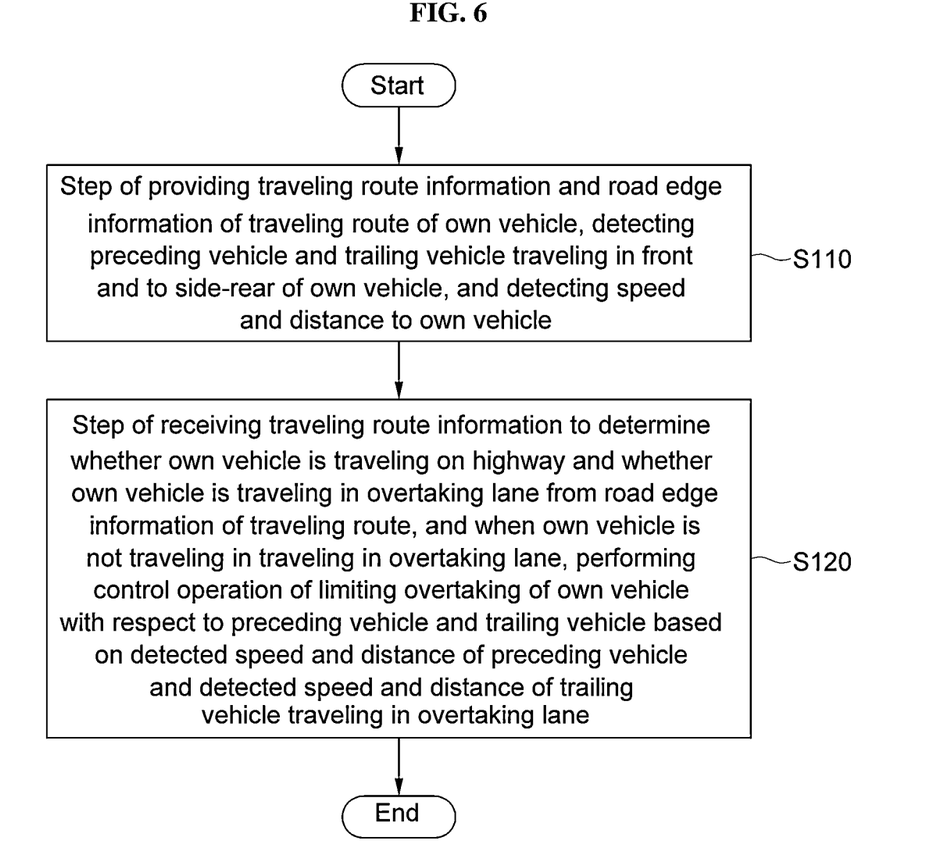
FIG. 6 is a flowchart schematically illustrating a vehicle overtaking control method according to one embodiment of the present disclosure.
Figure 7:
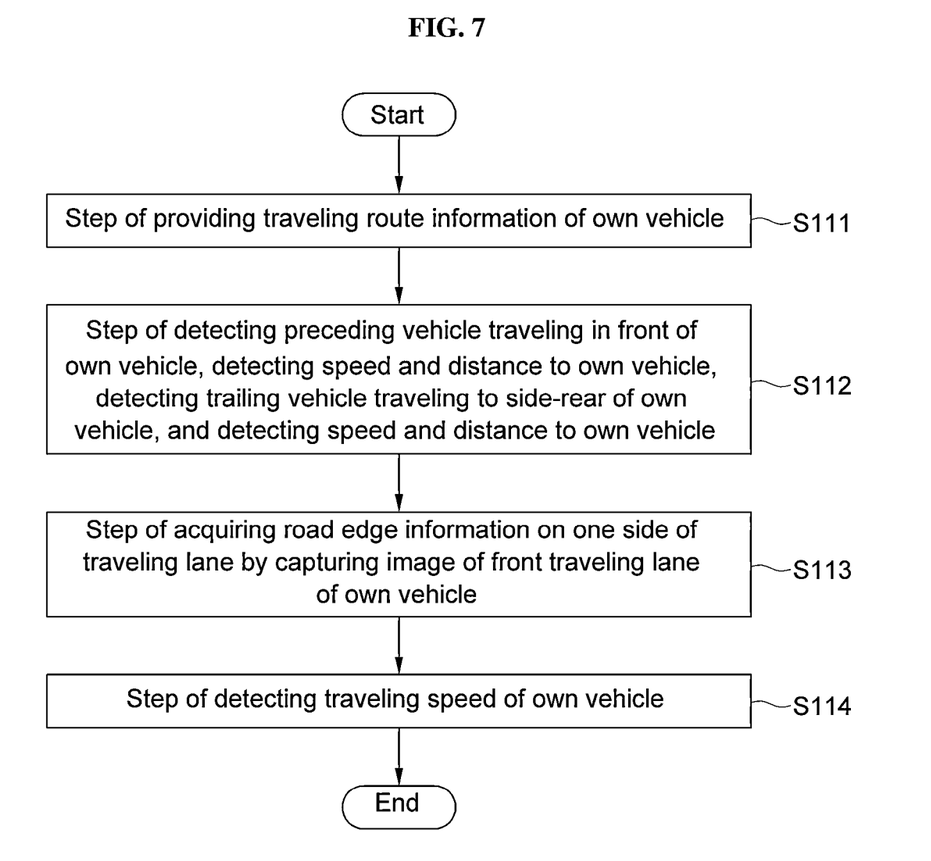
FIG. 7 is a flow chart of a method for detecting speed and distance of an own vehicle with respect to a preceding vehicle and a trailing vehicle in the overtaking lane of FIG. 6.
Figure 8:
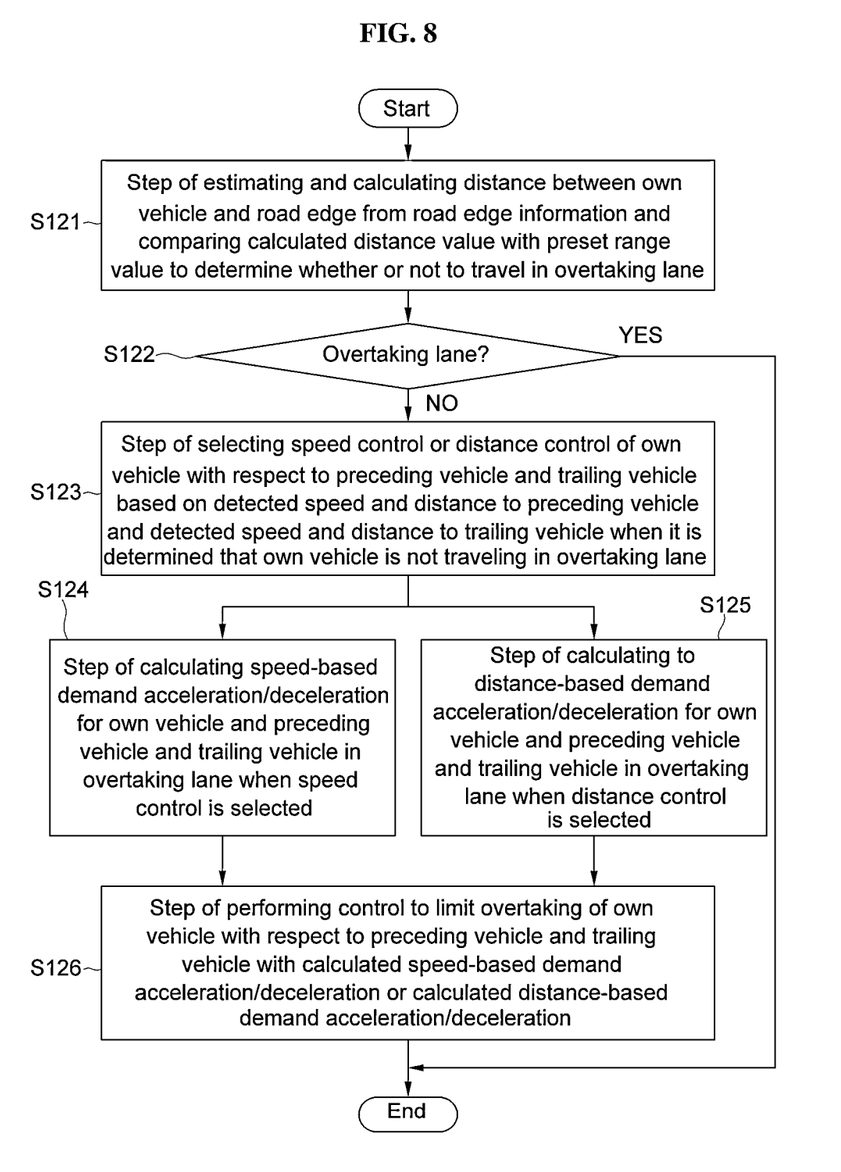
FIG. 8 is a flow chart of a control method for limiting overtaking with respect to the preceding vehicle and the trailing vehicle in the overtaking lane of FIG. 6.

FIG. 6 is a flowchart schematically illustrating a vehicle overtaking control method according to one embodiment of the present disclosure, FIG. 7 is a flow chart of a method for detecting the speed and distance of the own vehicle with respect to the preceding vehicle and the trailing vehicle in the overtaking lane of FIG. 6, and FIG. 8 is a flow chart of a control method for limiting overtaking with respect to the preceding vehicle and the trailing vehicle in the overtaking lane of FIG. 6.

In addition, in the overtaking control method of a vehicle according to one embodiment of the present disclosure, a step (S110) of providing the traveling route information and the road edge information of the traveling route of the own vehicle, detecting the preceding vehicle and the trailing vehicle traveling in front and to the side-rear of the own vehicle, and detecting the speed and distance to the own vehicle is performed.

More specifically, as illustrated in FIG. 7, the step (S110) of detecting the speed and distance includes the following steps.

First, a step of providing traveling route information of the own vehicle is performed (S111). Here, the navigation 111 provides road information about whether a route on which the own vehicle is currently traveling is a highway or a general road.

Then, the step (S112) of detecting the preceding vehicle traveling in front of the own vehicle, detecting the speed and distance to the own vehicle, detecting the trailing vehicle traveling to the side-rear of the own vehicle, and detecting the speed and distance to the own vehicle is performed. Here, the front detection sensor 112 detects the preceding vehicle traveling in front of the own vehicle and detects the speed and distance to the own vehicle, and the side-rear detection sensor 113 detect the trailing vehicle traveling to the side-rear of the own vehicle and detects the speed and distance to the own vehicle.

Subsequently, a step (S113) of acquiring the road edge information on one side of the traveling lane by capturing an image of the front traveling lane of the own vehicle is performed.

The front photographing unit 114 acquires the road edge information on one side of the traveling lane by capturing the image of the front traveling lane of the own vehicle.

According to one embodiment, the road edge is detected on one side of the front traveling lane photographed by the front photographing unit 114. For example, when a vehicle has a steering wheel on the left, it is detected whether there is a road edge in the left lane in the image of the traveling lane photographed in the front.

In other words, when the traveling route of the own vehicle is a highway, the median strip is installed in the center of the lane. Moreover, the left steering wheel is the standard, the median strip exists on the left side of the traveling own vehicle, and the road edge of the median strip is detected. Conversely, when the right steering wheel is the standard, the median strip exists on the right side of the traveling vehicle and the road edge of the median strip is detected.

Subsequently, a step (S114) of detecting the traveling speed, which is the wheel speed of the own vehicle, is performed.

Moreover, a step (S120) of receiving the traveling route information to determine whether the own vehicle is traveling on the highway and whether the own vehicle is traveling in the overtaking lane from the road edge information of the traveling route, and when the own vehicle is not traveling in the overtaking lane, performing the control operation of limiting overtaking of the own vehicle with respect to the preceding vehicle and the trailing vehicle based on the detected speed and distance of the preceding vehicle and the detected speed and distance of the trailing vehicle traveling in the overtaking lane is performed.

More specifically, as illustrated in FIG. 8, the step (S120) of performing the control operation includes the following steps.

First, a step (S121) of estimating and calculating the distance between the own vehicle and the road edge from the road edge information and comparing the calculated distance value with a preset range value to determine whether or not to travel in the overtaking lane is performed.

More specifically, in the step of determining whether or not to travel in the overtaking lane, it is determined whether the own vehicle is traveling in the overtaking lane by utilizing the highway traveling determination and front/rear-side object information of the corner radar, determined that it is the overtaking lane when the compared distance value between the own vehicle and the road edge is within a preset range value, and determined that it is not the overtaking lane when the distance value exceeds the preset range value.

That is, the highway traveling information is received from the navigation 111 to determine that the own vehicle is traveling on the highway, the detection information on whether the rear object approaches the target position (left or right) is received through the front detection sensor 112 and the side-rear detection sensor 113, and information detecting whether or not there is the road edge at the target position (left or right) is received through the front photographing unit 114.

At this time, it is detected that there is no approaching object information detected from the front detection sensor 112 and the side-rear detection sensor 113 and there is the road edge of the median strip, the overtaking lane determination unit 121 determines that the own vehicle travels in the overtaking lane.

Here, even when it is detected that there is the road edge of the median strip, the detected separation distance between the median strip and the own vehicle may be calculated and reflected in the overtaking lane determination.

For example, it may be determined that the own vehicle is traveling in the overtaking lane by reflecting the reference value that the separation distance value between the road edge and the own vehicle detected in the overtaking lane is smaller than the separation distance value between the road edge and the own vehicle detected in another lane.

Meanwhile, it may be determined that the own vehicle is not traveling in the overtaking lane by reflecting a reference value that the separation distance value between the road edge and the own vehicle is greater than the separation distance value between the road edge and the own vehicle detected in the overtaking lane even when there is information on the approaching object (preceding vehicle or trailing vehicle) detected from the front detection sensor 112 and the side-rear detection sensor 113 and the road edge of the median strip is detected.

Subsequently, when it is determined that the own vehicle is not traveling in the overtaking lane (S121), a step (S123) of selecting speed control or distance control of the own vehicle with respect to the preceding vehicle and the trailing vehicle based on the detected speed and distance to the preceding vehicle and the detected speed and distance to the trailing vehicle is performed.

More specifically, when it is determined that the own vehicle is not traveling in the overtaking lane, speed control or distance control of the own vehicle with respect to the preceding vehicle and the trailing vehicle is selected based on the detected speed and distance to the preceding vehicle and the detected speed and distance to the trailing vehicle.

More specifically, the distance control may be selected when the relative distance between the own vehicle and the preceding vehicle and trailing vehicle is equal to or more than a threshold value, and the speed control may be selected when the relative distance between the own vehicle and the preceding vehicle and the trailing vehicle is less than the threshold value.

For example, in a long-distance area where the relative distance between the preceding vehicle traveling in the overtaking lane and the own vehicle is equal to or more than a threshold value of 100 m, the distance-based control may be performed to perform smooth control with respect to the preceding vehicle.

Meanwhile, in a short-distance area where the relative distance between the trailing vehicle traveling in the overtaking lane and the own vehicle is equal to or less than the threshold of 30 m, the speed-based control can be performed to prevent excessive deceleration with respect to the trailing vehicle.

For example, when the distance-based control is performed in a state where the speed of the trailing vehicle is 100 kph and the speed of the own vehicle is 80 kph and the relative distance is 10 m, excessive deceleration may lead to a dangerous situation. Therefore, it may be desirable for safety to perform the speed-based control in order to match the speed with the trailing vehicle. In this case, since vehicles traveling in the right lane of the own vehicle are not subject to overtaking limiting, the own vehicle can overtake vehicles in the right lane.

Then, when the speed control is selected, a step (S124) of calculating the relative speed between the own vehicle and the preceding vehicle and calculating the speed-based demand acceleration/deceleration for the own vehicle and the preceding vehicle and trailing vehicle in the overtaking lane is performed.

More specifically, the relative speed between the own vehicle and the preceding vehicle is calculated, the relative speed between the own vehicle and the preceding and trailing vehicles in the overtaking lane is calculated, and the demand deceleration or demand acceleration at the relative speed having a smaller value is calculated.

For example, the demand acceleration/deceleration for the preceding vehicle is calculated using the relative speed between the own vehicle and the preceding vehicle, and the demand acceleration/deceleration for the preceding vehicle and the trailing vehicle is calculated using the relative speed between the preceding vehicle and the trailing vehicle in the overtaking lane.

At this time, a smaller demand acceleration/deceleration is finally calculated by comparing the two detected demand acceleration/decelerations. That is, when the demand deceleration between the own vehicle and the preceding vehicle is 15 kph and the demand deceleration for the preceding vehicle in the overtaking lane is 10 kph, 10 kph which is a smaller value is calculated as the final demand deceleration.

Then, a step (S125) of calculating the distance-based demand acceleration/deceleration with respect to the own vehicle and the preceding vehicle and trailing vehicle in the overtaking lane when the distance control is selected by the distance/speed control selection unit is performed.

More specifically, the relative distance between the own vehicle and the preceding vehicle is calculated, the relative distance between the own vehicle and the preceding vehicle in the overtaking lane is calculated, the relative distance between the own vehicle and the trailing vehicle in the overtaking lane is calculated, and the demand deceleration or demand acceleration at the relative distance having a smaller value is calculated.

Then, a step (S126) of performing control to limit the overtaking of the own vehicle with respect to the preceding vehicle and the trailing vehicle with the calculated speed-based demand acceleration/deceleration or the calculated distance-based demand acceleration/deceleration is performed.

The description of the present disclosure described above is for illustrative purposes, and a person with ordinary knowledge in the technical field to which the present disclosure belongs will understand that it can be easily modified into other specific forms without changing the technical spirit or essential characteristics of the present disclosure. Therefore, the embodiments described above should be understood as illustrative in all respects and not limiting. For example, each component described as a single type may be implemented in a distributed manner, and similarly, components described as distributed may be implemented in a combined form.

The scope of the present disclosure is indicated by the claims to be described later rather than the detailed description above, and all changes or modifications derived from the meaning and scope of the claims and their equivalent concepts should be construed as being included in the scope of the present disclosure.

[Detailed Description of Main Elements]

110: traveling information detection means
111: navigation
112: front detection sensor
113: side-rear detection sensor
114: front photographing unit
115: speed sensor
120: overtaking control means
121: overtaking lane determination unit
122: distance/speed control selection unit
123: speed-based demand acceleration/deceleration calculation unit
124: distance-based demand acceleration/deceleration calculation unit
125: control unit

What is claimed is:

1. A vehicle overtaking control system comprising:
a traveling information detection means configured to provide traveling route information and road edge information of a traveling route of an own vehicle, detect a preceding vehicle and a trailing vehicle traveling in front and to a side-rear of the own vehicle, and detect a speed and distance to the own vehicle; and
an overtaking control means configured to receive the traveling route information to determine whether the own vehicle is traveling on the highway and whether the own vehicle is traveling in an overtaking lane from the road edge information of the traveling route, and when the own vehicle is not traveling in the overtaking lane, perform a control operation of limiting overtaking of the own vehicle with respect to the preceding vehicle and the trailing vehicle based on the detected speed and distance of the preceding vehicle and the detected speed and distance of the trailing vehicle traveling in the overtaking lane.

2. The vehicle overtaking control system of claim 1, wherein the overtaking lane is defined as a traveling lane on a steering wheel side of the own vehicle, and in a case of a left-hand drive vehicle, a left lane is the overtaking lane, and in the case of a right-hand drive vehicle, a right lane is the overtaking lane.

3. The vehicle overtaking control system of claim 1, wherein the traveling information detection means includes
navigation configured to provide the traveling route information of the own vehicle,
a front detection sensor configured to detect a preceding vehicle traveling in front of the own vehicle and measure speed and distance between the own vehicle and the preceding vehicle,
a side-rear detection sensor configured to detect a trailing vehicle traveling to the side-rear of the own vehicle and measure speed and distance between the own vehicle and the traveling vehicle,
a front photographing unit configured to acquire road edge information on one side of the traveling lane by capturing an image of a front traveling lane of the own vehicle, and
a speed sensor configured to detect the traveling speed of the own vehicle.

4. The vehicle overtaking control system of claim 1, wherein the overtaking control means includes
an overtaking lane determination unit configured to estimate and calculate a distance between the own vehicle and a road edge from the road edge information of the traveling information detection means and compare the calculated distance value with a preset range value to determine whether or not to travel in the overtaking lane,
a distance/speed control selection unit configured to select speed control or distance control of the own vehicle with respect to the preceding vehicle and the trailing vehicle based on the detected speed and distance to the preceding vehicle and the detected speed and distance to the trailing vehicle, when the overtaking lane determination unit determines that the own vehicle is not traveling in the overtaking lane,
a speed-based demand acceleration/deceleration calculation unit configured to calculate a relative speed between the own vehicle and the preceding vehicle and calculate a relative speed between the own vehicle and the preceding vehicle and trailing vehicle in the overtaking lane to calculate speed-based demand acceleration/deceleration, when the speed control is selected by the distance/speed control selection unit,
a distance-based demand acceleration/deceleration calculation unit configured to calculate the relative distance between the own vehicle and the preceding vehicle and calculate the relative distance between the own vehicle and the preceding vehicle and the trailing vehicle in the overtaking lane to calculate distance-based demand acceleration/deceleration, when the distance control is selected by the distance/speed control selection unit, and a control unit configured to perform control to limit overtaking of the own vehicle with respect to the preceding vehicle and the trailing vehicle in the overtaking lane by the calculated speed-based demand acceleration/deceleration or the calculated distance-based demand acceleration/deceleration.

5. The vehicle overtaking control system of claim 4, wherein the overtaking lane determination unit determines that it is the overtaking lane when the compared distance value between the own vehicle and the road edge is within a preset range value, and determines that it is not the overtaking lane when the distance value exceeds the preset range value.

6. The vehicle overtaking control system of claim 4, wherein the distance/speed control selection unit selects the distance control when the relative distance between the own vehicle and the preceding vehicle and the trailing vehicle is equal to or more than a threshold value.

7. The vehicle overtaking control system of claim 4, wherein the distance/speed control selection unit selects the speed control when the relative distance between the own vehicle and the preceding vehicle and the trailing vehicle is less than a threshold value.

8. The vehicle overtaking control system of claim 4, wherein the speed-based demand acceleration/deceleration calculation unit calculates the relative speed between the own vehicle and the preceding vehicle, calculates the relative speed between the own vehicle and the trailing vehicle, and calculates the demand deceleration or demand acceleration at the relative speed having a smaller value.

9. The vehicle overtaking control system of claim 4, wherein the distance-based demand acceleration/deceleration calculation unit calculates the relative distance between the own vehicle and the preceding vehicle, calculates the relative distance between the own vehicle and the trailing vehicle, and calculates the demand deceleration or demand acceleration at the relative distance having a smaller value.

10. The vehicle overtaking control system of claim 1, wherein the overtaking control means performs a control operation to limit the overtaking so as to further include a condition where a wheel speed of the own vehicle is equal to or more than a threshold value.

11. A vehicle overtaking control method comprising:
providing traveling route information and road edge information of a traveling route of an own vehicle, detecting a preceding vehicle and a trailing vehicle traveling in front and to a side-rear of the own vehicle, and detecting a speed and distance to the own vehicle; and
receiving the traveling route information to determine whether the own vehicle is traveling on the highway and whether the own vehicle is traveling in an overtaking lane from the road edge information of the traveling route, and when the own vehicle is not traveling in the overtaking lane, performing a control operation of limiting overtaking of the own vehicle with respect to the preceding vehicle and the trailing vehicle based on the detected speed and distance of the preceding vehicle and the detected speed and distance of the trailing vehicle traveling in the overtaking lane.

12. The vehicle overtaking control method of claim 11, wherein the overtaking lane is defined as a traveling lane on a steering wheel side of the own vehicle, and in a case of a left-hand drive vehicle, a left lane is the overtaking lane, and in the case of a right-hand drive vehicle, a right lane is the overtaking lane.

13. The vehicle overtaking control method of claim 11, wherein the detecting of the speed and distance includes
providing the traveling route information of the own vehicle,
detecting a preceding vehicle traveling in front of the own vehicle to measure speed and distance between the own vehicle and the preceding vehicle and detecting a trailing vehicle traveling to a side-rear of the own vehicle to measure speed and distance between the own vehicle and the traveling vehicle,
acquiring road edge information on one side of the traveling lane by capturing an image of a front traveling lane of the own vehicle, and
detecting the traveling speed of the own vehicle.

14. The vehicle overtaking control method of claim 11, wherein the performing of the control operation includes
estimating and calculating a distance between the own vehicle and a road edge from the road edge information and comparing the calculated distance value with a preset range value to determine whether or not to travel in the overtaking lane,
selecting speed control or distance control of the own vehicle with respect to the preceding vehicle and the trailing vehicle based on the detected speed and distance to the preceding vehicle and the detected speed and distance to the trailing vehicle, when it is determined that the own vehicle is not traveling in the overtaking lane,
calculating a relative speed between the own vehicle and the preceding vehicle and calculating a relative speed between the own vehicle and the preceding vehicle and trailing vehicle in the overtaking lane is calculated to calculate speed-based demand acceleration/deceleration, when the speed control is selected,
calculating the relative distance between the own vehicle and the preceding vehicle and calculating the relative distance between the own vehicle and the preceding vehicle and the trailing vehicle in the overtaking lane to calculate distance-based demand acceleration/deceleration, when the distance control is selected, and
performing control to limit overtaking of the own vehicle with respect to the preceding vehicle and the trailing vehicle in the overtaking lane by the calculated speed-based demand acceleration/deceleration or the calculated distance-based demand acceleration/deceleration.

15. The vehicle overtaking control method of claim 14, wherein in the determining of whether or not to travel in the overtaking lane, it is determined that it is the overtaking lane when the compared distance value between the own vehicle and the road edge is within a preset range value, and it is determined that it is not the overtaking lane when the distance value exceeds the preset range value.

16. The vehicle overtaking control method of claim 14, wherein in the selecting of the speed control or the distance control, the distance control is selected when the relative distance between the own vehicle and the preceding vehicle and the trailing vehicle is equal to or more than a threshold value.

17. The vehicle overtaking control method of claim 14, wherein in the selecting of the speed control or the distance control, the speed control is selected when the relative distance between the own vehicle and the preceding vehicle and the trailing vehicle is less than a threshold value.

18. The vehicle overtaking control method of claim 14, wherein in the calculating of the speed-based demand acceleration/deceleration, the relative speed between the own vehicle and the preceding vehicle is calculated, the relative speed between the own vehicle and the preceding vehicle in the overtaking lane and the relative speed between the own vehicle and the trailing vehicle in the overtaking lane are calculated, and the demand deceleration or demand acceleration is calculated at the relative speed having a smaller value.

19. The vehicle overtaking control method of claim 14, wherein in the calculating of the distance-based demand acceleration/deceleration, the relative distance between the own vehicle and the preceding vehicle is calculated, the relative distance between the own vehicle and the preceding vehicle in the overtaking lane and the relative distance between the own vehicle and the trailing vehicle in the overtaking lane are calculated, and the demand deceleration or demand acceleration is calculated at the relative distance having a smaller value.

20. The vehicle overtaking control method of claim 11, wherein in the performing of the control operation to limit the overtaking, a control operation is performed to limit the overtaking so as to further include a condition where a wheel speed of the own vehicle is equal to or more than a threshold value.

* * * * *